US012134416B2

(12) United States Patent
Yanai et al.

(10) Patent No.: US 12,134,416 B2
(45) Date of Patent: Nov. 5, 2024

(54) TRAFFIC CONTROL SYSTEM

(71) Applicant: MITSUBISHI HEAVY INDUSTRIES, LTD., Tokyo (JP)

(72) Inventors: Noritaka Yanai, Tokyo (JP); Masahiro Yamada, Tokyo (JP); Tomonori Ishikawa, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1013 days.

(21) Appl. No.: 16/968,224

(22) PCT Filed: Feb. 19, 2019

(86) PCT No.: PCT/JP2019/006160
§ 371 (c)(1),
(2) Date: Aug. 7, 2020

(87) PCT Pub. No.: WO2019/163792
PCT Pub. Date: Aug. 29, 2019

(65) Prior Publication Data
US 2021/0031819 A1     Feb. 4, 2021

(30) Foreign Application Priority Data

Feb. 20, 2018  (JP) .............................. JP2018-028167

(51) Int. Cl.
*B61L 27/00*     (2022.01)
*B61L 25/02*     (2006.01)
(Continued)

(52) U.S. Cl.
CPC ............... *B61L 27/20* (2022.01); *B61L 25/02* (2013.01); *B60L 15/40* (2013.01); *B60L 2200/26* (2013.01); *B60L 2240/12* (2013.01); *B61L 23/14* (2013.01)

(58) Field of Classification Search
CPC .......... B61L 27/20; B61L 25/02; B61L 23/14; B61L 15/0072; B61L 3/006; B60L 15/40; B60L 2200/26; B60L 2240/12
See application file for complete search history.

(56) References Cited

U.S. PATENT DOCUMENTS

| 6,250,590 B1 * | 6/2001 | Hofestadt ............... B61L 27/14 246/167 R |
| 2014/0209753 A1 * | 7/2014 | Takahashi ............. B61L 25/025 246/122 R |

FOREIGN PATENT DOCUMENTS

| EP | 2708440 A1 | 3/2014 |
| JP | 09104347 A * | 4/1997 |
| (Continued) | | |

OTHER PUBLICATIONS

Machine Translation of KR-1449740-B1 (Year: 2014).*
(Continued)

*Primary Examiner* — Sahar Motazedi
(74) *Attorney, Agent, or Firm* — HAUPTMAN HAM, LLP

(57) ABSTRACT

The present invention provides an operation system which can finely control the operation of a train in response to the operation state of the train at low cost in a traffic system that uses a process of dynamically setting a path and an operation interval. This traffic control system is provided with: on-board control units installed on trains that are traveling, and an on-ground control unit installed on the ground. The on-board control units are installed on a plurality of trains, respectively, the operations of which are managed by the traffic control systems, perform a track demand on the basis of a delivered operation mode, and deliver information on the track demand to the on-ground control unit. The on-
(Continued)

ground control unit controls the progress of the train on the basis of the delivered track demand.

2 Claims, 12 Drawing Sheets

(51) Int. Cl.
  *B61L 27/20* (2022.01)
  *B60L 15/40* (2006.01)
  *B61L 23/14* (2006.01)

(56) References Cited

FOREIGN PATENT DOCUMENTS

| JP | H1178894 | A |   | 3/1999 |
| JP | 2001030905 | A | * | 2/2001 |
| JP | 2003095103 | A | * | 4/2003 |
| JP | 2010213383 | A | * | 9/2010 |
| JP | 2010215158 | A | * | 9/2010 |
| JP | 2010228688 | A | * | 10/2010 |
| JP | 2011073641 | A | * | 4/2011 |
| JP | 5275962 | B2 |   | 8/2013 |
| JP | 2013258847 | A | * | 12/2013 |
| JP | 2014148260 | A | * | 8/2014 |
| JP | 2014522336 | A |   | 9/2014 |
| JP | 2015009604 | A | * | 1/2015 |
| JP | 2017019381 | A | * | 1/2017 | ............. B61L 11/08 |
| JP | 2017055518 | A | * | 3/2017 |
| KR | 1449740 | B1 | * | 10/2014 |

OTHER PUBLICATIONS

Machine Translation of JP-2017055518-A (Year: 2017).*
Machine Translation of JP-2010228688-A (Year: 2010).*
Machine Translation of JP-2015009604-A (Year: 2015).*
Machine Translation of JP-2010213383-A (Year: 2010).*
Machine Translation of JP-2001030905-A (Year: 2001).*
Machine Translation of JP2010215158A (Year: 2010).*
Machine Translation of JP2013258847A (Year: 2013).*
Machine Translation of JP2011073641A (Year: 2011).*
Machine Translation of JP2014148260A (Year: 2014).*
Machine Translation of JP2017019381A (Year: 2017).*
Machine Translation of JP2003095103A (Year: 2003).*
Machine Translation of JPH09104347A (Year: 1997).*
International Search Report and Written Opinion of International Application Number mailed Feb. 19, 2019; 7pp.

* cited by examiner

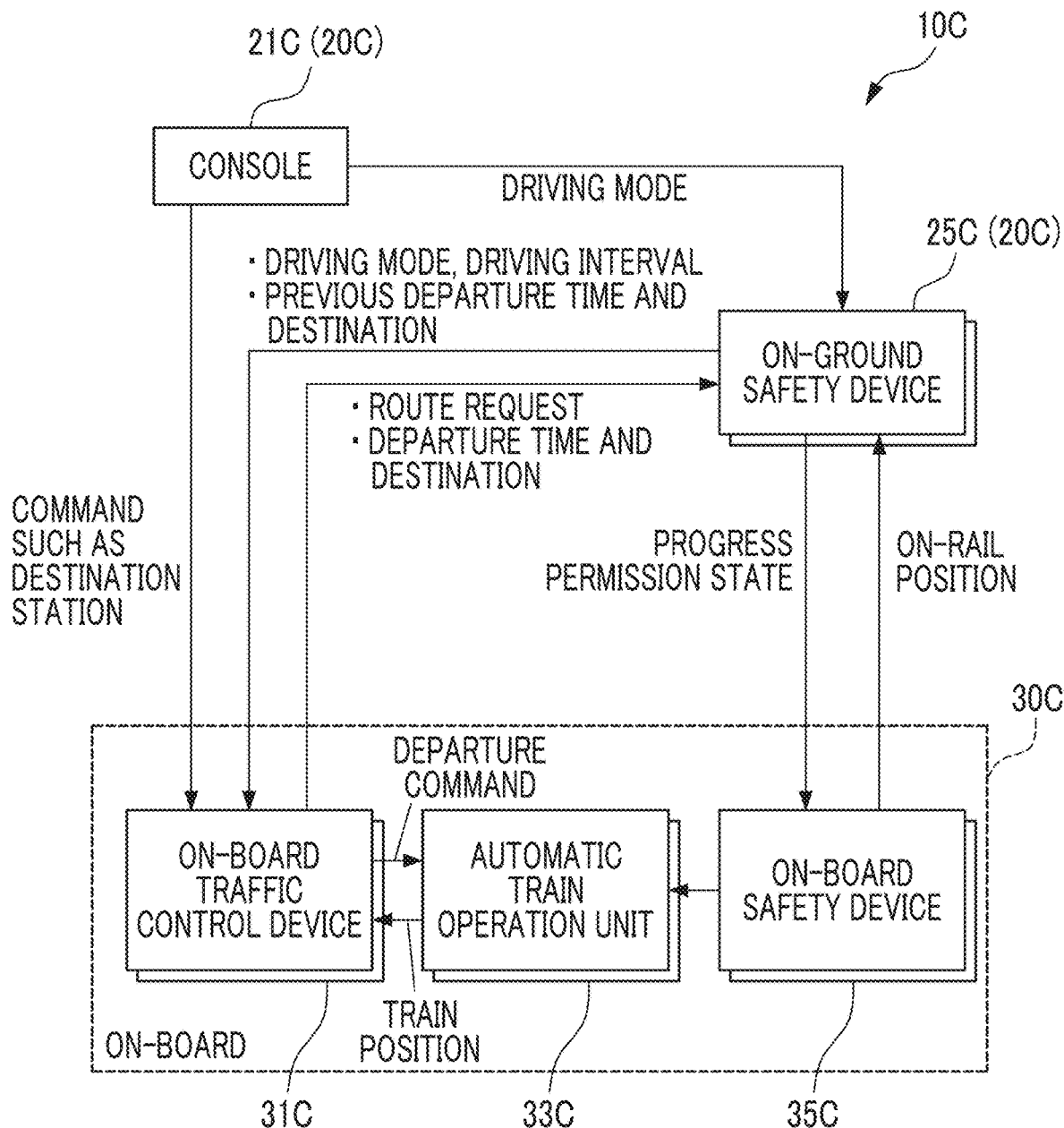

TRAFFIC CONTROL SYSTEM

RELATED APPLICATIONS

The present application is a National Phase of International Application Number PCT/JP2019/006160 filed Feb. 19, 2019 and claims priority to Japanese Application Number 2018-028167 filed Feb. 20, 2018.

TECHNICAL FIELD

The present invention relates to an traffic control system which manages the operation of a train traveling on a track.

BACKGROUND ART

In the related art, in a traffic system that provides a transportation service by trains traveling along a predetermined track, the operation of each train is managed based on a pre-defined schedule (timetable). Specifically, the traffic control device, which is a so-called ground facility, issues an instruction to travel to each train, based on the arrival time, departure time, or the like set for each train, and each train that receives the instruction operates according to that instruction.

There is also a train traffic system that operates trains at regular time intervals without using a schedule. Even in this train traffic system, an traffic control device is installed on the ground. This traffic control device is a non-safety system that operates a number of trains constituting a train traffic system at predetermined time intervals and paths.

In addition to the traffic control device, the train traffic system described above includes a safety device called an interlocking device as an on-ground facility. The interlocking device interlocks and controls a traffic light, which is a safety facility on the ground, and a switch (a device that switches the route of a train at a branch). The interlocking device, together with automatic train control (ATC) or the like, controls the train operation such that the train does not collide or derail.

The traffic control device and the interlocking device are common in that they are ground facilities whose positions are fixed, but the required safety is different. Therefore, the traffic control device and the interlocking device are constructed as separate systems. For example, Patent Document 1 discloses a route setting device (5) as an traffic control device and an interlocking device (1) as separate systems.

A pinched loop mode and double shuttle mode are known as operating methods in a system that operates trains at regular time intervals.

In the pinched loop mode, as shown in FIG. 2A, for example, three trains travel at equal time intervals on a track formed by a loop path.

In the double shuttle mode, as shown in FIG. 2B, one train shuttles on each of the up and down lines.

The pinched loop mode and the double shuttle mode will be described in detail in the section of the embodiment.

The traffic control system constantly knows the position of each train by acquiring the train position in each train block unit from the devices in the ground safety system (interlocking device and ATC device). Based on the position of the train and a preset train operation plan, a route request is made to the on-ground safety facility at an appropriate timing. Here, the route request refers to a request to the safety facility to occupy a route on which the train will travel and to lock such that another train cannot enter. The safety facility rejects a request for a route that has already been locked, because even if a route request is received from another train, the lock performed in advance cannot be released. It should be noted that the route is the minimum unit of the path, and the path is an aggregate of the routes.

The route request will be described with reference to FIG. 4A.

For example, it is assumed that the train 3A travels on the path indicated by the arrow. In this case, the traffic control device requests the safety device for a route in the order I, II, III, and IV. The interlocking device checks the conditions of the safety facility, with respect to the setting of this route, and when it is determined that the train is safe to follow this route, the interlocking device locks the routes I, II, III, and IV, and makes the traffic light at the entrance of each route show progress, that is, green.

Since the safety is secured by the safety system device, even if the traffic control device fails and stops, the safety is not affected. However, when the traffic control device stops, the train stops and it becomes impossible to continue the operation. Therefore, a redundant configuration is adopted for the traffic control device such that the operation can be continued as much as possible, that is, the availability is maintained.

CITATION LIST

Patent Literature

[PTL 1] Japanese Patent No. 5275962

SUMMARY OF INVENTION

Technical Problem

In a traffic system for dynamically setting only paths and train driving intervals without a schedule, it is necessary to install independent hardware as an traffic control device on the ground and to adopt redundant configuration in spite of the simple function of the traffic control device. Therefore, the traffic system of this method is expensive.

In addition, it is difficult for the traffic control device on the ground to know the exact position, speed, and a detailed state such as other abnormal state of the train. Therefore, it is not possible to perform detailed control according to the state of the train.

As described above, an object of the present invention is to provide an operation system which can finely control the driving of a train in response to the operation state of the train at low cost, in a traffic system that dynamically sets a path and a driving interval.

Solution to Problem

The traffic control system of the present invention includes an on-board control unit installed on a traveling train and an on-ground control unit installed on the ground.

The on-board control unit in the present invention is installed in each of a plurality of trains whose operations are managed by the traffic control system, makes a route request based on a transmitted driving mode, and transmits the information on the route request to the on-ground control unit.

the on-ground control unit of the present invention controls a route of the train, based on the transmitted route request.

Here, the traffic control system in the related art described in the section of the background art is separated from the safety device such as the interlocking device, but in the traffic control system of the present invention, the on-ground control unit also has the function of the safety device in the related art. However, since the safety function itself of the safety device is the same as that of the safety device in the related art, only the traffic control function will be described below.

The on-board control unit in the present invention preferably controls driving of the train, based on a traveling position and a traveling speed detected in the train provided with the on-board control unit.

In the on-board control unit according to the present invention, the instructed driving mode is preferably transmitted via the on-ground control unit.

The on-board control unit in the present invention preferably sets the driving path of the train provided with the on-board control unit, based on the departure time and destination of another preceding train, transmitted from the on-ground control unit.

The on-board control unit in the present invention preferably sets the driving path of the train provided with the on-board control unit, based on a transmitted destination.

The on-board control unit in the present invention preferably makes a route request for a route to turn back, when a driving path is set in which the train provided with the on-board control unit performs a turning-back driving, and in a case where the route request can be made, makes a route request for a branch route leading to the route to turn back.

This on-board control unit preferably cancels the route request of the route when the train provided with the on-board control unit passes, but regarding the branch route, even when the train provided with the on-board control unit passes, the on-board control unit maintains the route request only for a predetermined period, and then, cancels the route request.

Advantageous Effects of Invention

According to the traffic control system of the present invention, the on-board control unit is installed in each of the plurality of trains, makes a route request based on a transmitted driving mode, and transmits the information on the route request to the on-ground control unit. That is, according to the present invention, the vehicle itself has a function of requesting a route, and the position and the speed of the vehicle provided with the on-board control unit at the present time when the route is requested can be obtained with high accuracy, so that the driving of a train can be finely controlled in response to the operation state of the train.

Further, by incorporating the function for requesting a route into the control unit originally installed on the vehicle as, for example, software, it is possible to eliminate the traffic control device as hardware that has been installed on the ground until then. Thus, the traffic control system of the present invention contributes to cost reduction.

BRIEF DESCRIPTION OF DRAWINGS

FIG. 8 is a functional block diagram showing an traffic control system according to a third embodiment of the present invention.

DESCRIPTION OF EMBODIMENTS

Hereinafter, embodiments of the present invention will be described with reference to the accompanying drawings.

Here, four embodiments will be referred to, but an item common to the four embodiments, that is, the entire traffic system 1, will be first described, and then the four embodiments will be sequentially described.

[Common Subject Matter]

Figure 1:
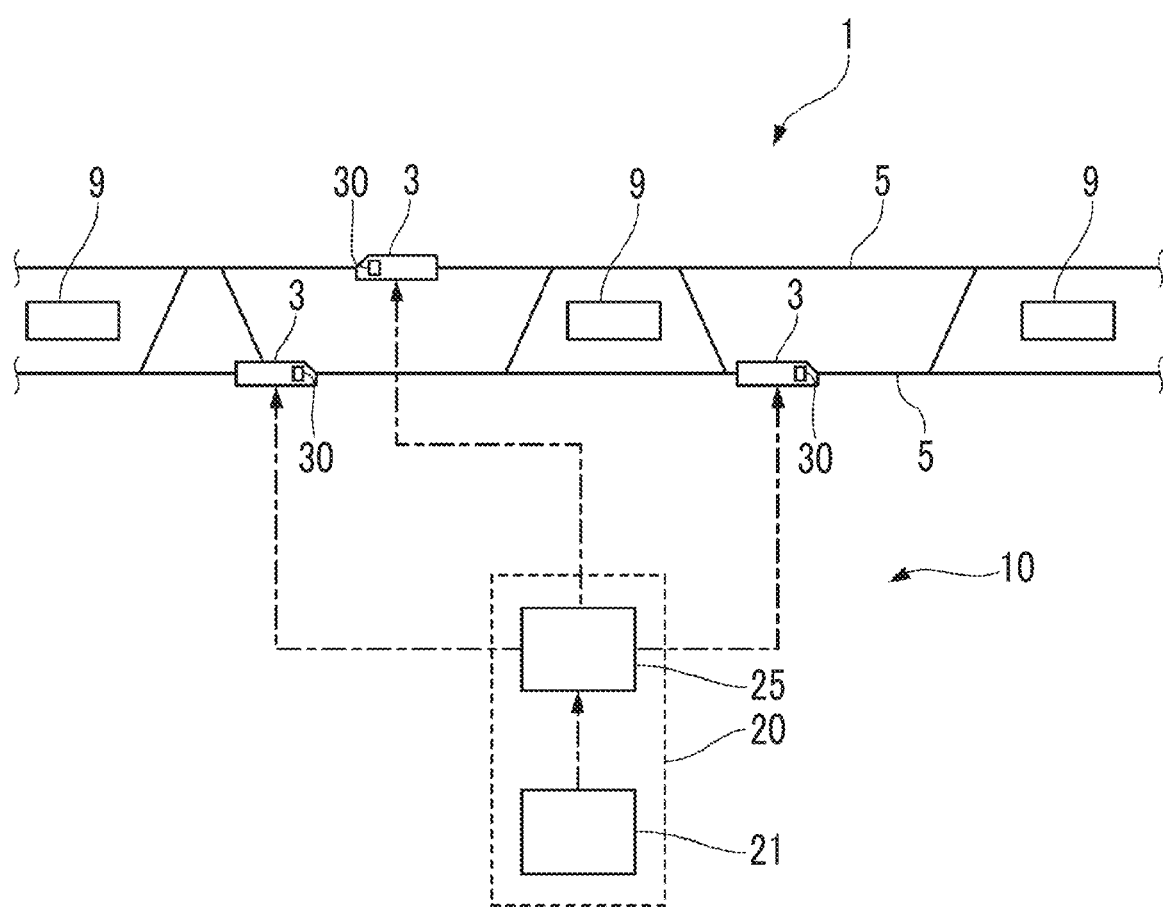
FIG. 1 is a block diagram showing elements of a traffic system common to all the embodiments of the present invention.

The traffic system 1 according to the present embodiment controls the operation of a plurality of trains 3 traveling on a track 5, as shown in FIG. 1. A plurality of platforms 9 are provided at predetermined intervals on the track 5, and the traffic system 1 automatically operates a plurality of trains 3 at predetermined time intervals on the path.

The traffic system 1 includes an traffic control system 10 having an on-ground control unit 20 and an on-board control unit 30, and the on-ground control unit 20 and the on-board control unit 30 of the traffic control system 10 cooperate with each other, so that the safe and reliable operation of the traffic system 1 can be realized. The on-ground control unit 20 is a common facility in the traffic system 1, but the on-board control unit 30 is provided for each of the plurality of trains 3. The on-ground control unit 20 and the on-board control unit 30 will be described in detail later, but the on-ground control unit 20 plays a role of safety for ensuring safe operation, and the on-board control unit 30 plays a main role of requesting a route.

[Operation Mode]

In the traffic system 1, the train 3 is operated while switching a plurality of operation modes using the same track 5.

Typical examples of the operation modes are a pinched loop mode and a double shuttle mode. The pinched loop mode is selected when there are many passengers, and the double shuttle mode is selected when there are few passengers. The operator gives an instruction to select the pinched loop mode or the double shuttle mode via the console 21 which constitutes the on-ground control unit 20, and this instruction is transmitted to the on-board control unit 30 via the on-ground safety device 25 which has received the instruction.

[Pinched Loop Mode]

Figure 2A:
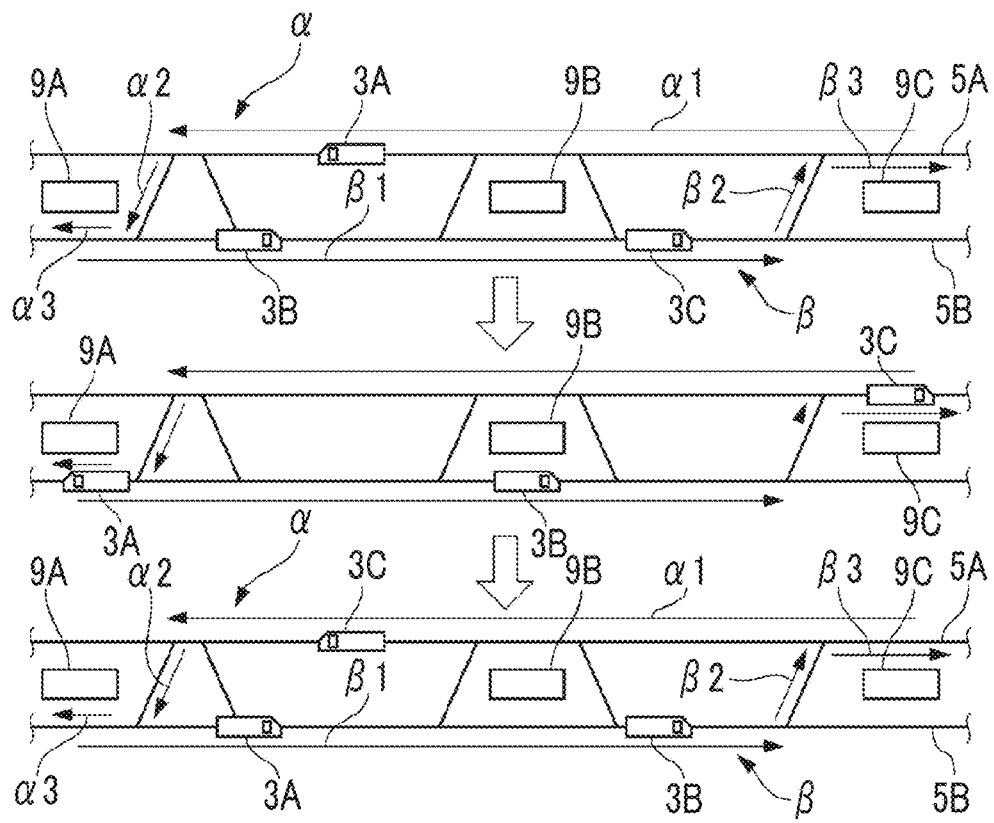
FIGS. 2A-2B are diagrams illustrating driving modes in the traffic system in FIG. 1.

In the pinched loop mode, as shown in FIG. 2A, for example, three trains 3 travel at equal time intervals, using the track 5 as a loop path. FIG. 2A has a driving path α indicated by arrows α1, α2, and α3 and a driving path β indicated by arrows β1, β2, and β3.

Now, the trains 3A, 3B, and 3C are traveling at the positions shown in the upper part of FIG. 2A.

As time elapses from this, as shown in the middle part of FIG. 2A, the train 3A travels from the path α1 to the path α3 and reaches the platform 9A, the train 3B travels along the previous path β1 and reaches the platform 9B, and the train 3C travels from the path β1 to the path β3 and reaches the platform 9C.

As time further elapses, as shown in the lower part of FIG. 2A, the train 3A turns back on the path α3 and travels along the path β2 toward the platform 9B, the train 3B travels along the path β1 and passes through the platform 9B, and the train 3C turns back on the path β3, travels along the path α1, and passes through the platform 9B.

As described above, in the pinched loop mode, for example, the trains 3A, 3B, and 3C travel around a loop path. The number of trains 3 used in the pinched loop mode is not limited to three, and four or more trains 3 may be put in depending on the number of passengers.

[Double Shuttle Mode]

Next, in the double shuttle mode, one train 3A and one train 3B reciprocate on the tracks 5A and 5B.

Figure 2B:
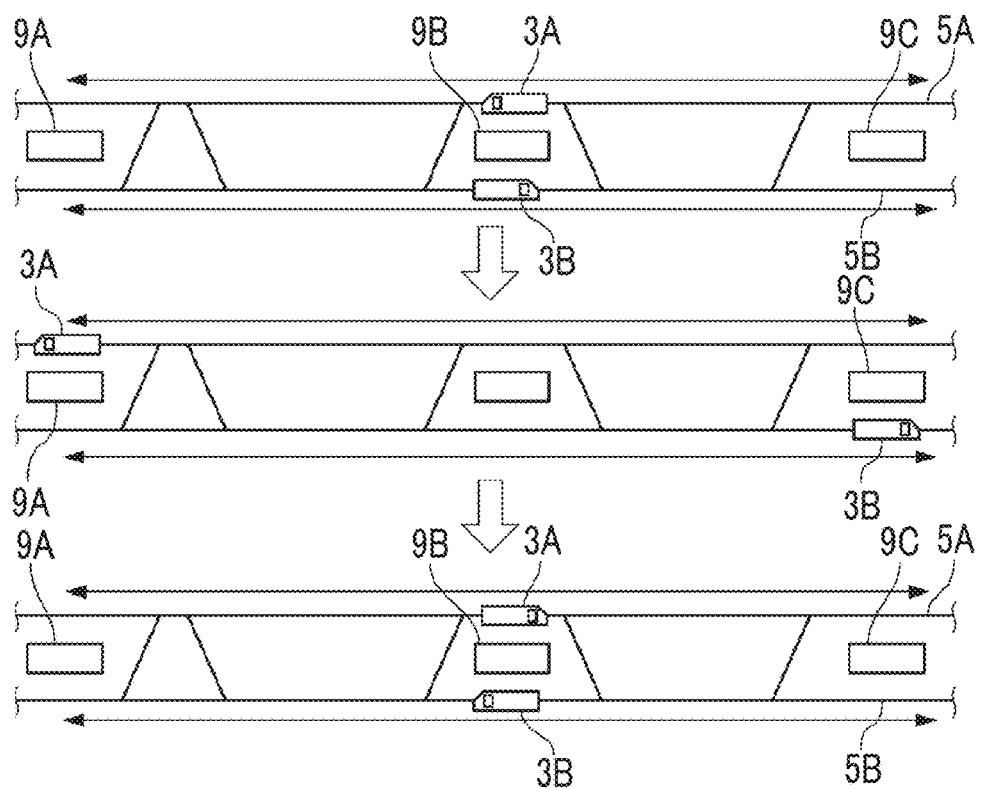

For example, as shown in the upper part of FIG. 2B, the train 3A stops at the platform 9B on the track 5A, and the train 3B stops at the platform 9B on the track 5B.

As time elapses, as shown in the middle part of FIG. 2B, the train 3A reaches the platform 9A on the track 5A and the train 3B reaches the platform 9C on the track 5B.

As time further elapses, as shown in the lower part of FIG. 2B, the train 3A reaches the platform 9A on the track 5A, and the train 3B reaches the platform 9B on the track 5B. However, the directions of the train 3A and the train 3B are opposite to the directions in the upper part of FIG. 2B.

The double shuttle mode is selected when the number of passengers is less than that in the pinched loop mode, but when the number of passengers is less, the operation mode may be switched to the single shuttle mode using only the track 5A or the track 5B.

First Embodiment

Next, the traffic control system 10A according to the first embodiment will be described with reference to FIGS. 3 to 5.

Figure 3:
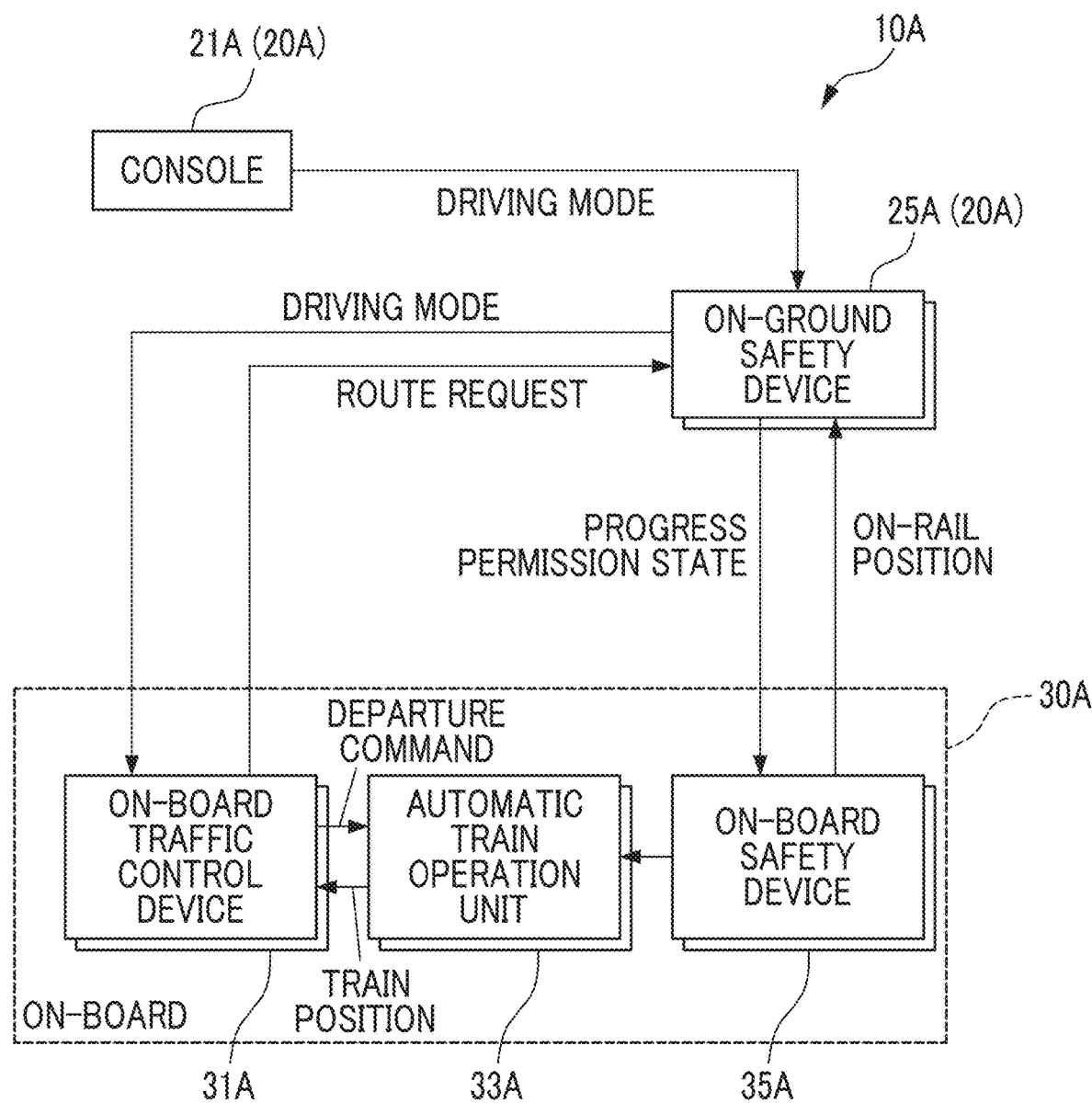
FIG. 3 is a functional block diagram showing an traffic control system according to the first embodiment of the present invention.

As shown in FIG. 3, the traffic control system 10A includes an on-ground control unit 20A and an on-board control unit 30A. In the description of common items, the on-ground control unit 20 and the on-board control unit 30 are referred to, but in the first to fourth embodiments, alphabets are added such as the on-ground control unit 20A and the on-board control unit 30A to distinguish them.

The contents will be described below in the order of the on-ground control unit 20A and the on-board control unit 30A.

[On-Ground Control Unit 20A]

As shown in FIG. 3, the on-ground control unit 20A includes a console 21A and an on-ground safety device 25A.

The console 21A and the on-ground safety device 25A may be installed in the vicinity, for example, in the same building, or may be installed at a distance.

The console 21A and the on-ground safety device 25A may be connected by a local area network (LAN), a universal serial bus (USB), or the like, which is wired communication, or may be connected by WiFi, which is wireless communication.

[Console 21A]

The console 21A is a terminal such as a personal computer (PC) that allows an operator to visually check the operation status of the traffic system 1 and give various instructions to the traffic system 1.

In the present embodiment, the console 21A is used for the operator to select one of the driving modes described above, and transmits the selected driving mode to the on-ground safety device 25A via the communication means described above. The driving mode is transmitted via the redundant on-ground safety device 25A to reliably transmit the driving mode to all trains.

The operator typically selects the pinched loop mode, the double shuttle mode, or the like, depending on the number of passengers.

[On-Ground Safety Device 25A]

The on-ground safety device 25A ensures the safe operation of each train 3 by controlling the safety facility. The safety equipment here is a traffic light and a switch.

As shown in FIG. 3, the on-ground safety device 25A mutually transmits and receives information to and from the on-board traffic control device 31 of the on-board control unit 30A, and mutually transmits and receives information to and from the on-board safety device 35A of the on-board control unit 30A.

The on-ground safety device 25A transmits the driving mode transmitted from the console 21A to the on-board traffic control device 31A of the on-board control unit 30A. The on-board traffic control device 31A makes a route request based on the transmitted driving mode.

When the on-ground safety device 25A receives the information on the route request from the on-board traffic control device 31A, the on-ground safety device 25A determines whether or not the train 3 can depart from the viewpoint of safety, as the beginning of a series of procedures for controlling the route of the train 3. Here, when the on-ground safety device 25A permits the departure, the on-ground safety device 25A can make the traffic light corresponding to the route show the progress, that is, green, and enable the departure of the train 3. When this traffic light remains red, train 3 will remain stopped.

The on-ground safety device 25A transmits progress permission information to the on-board safety device 35A.

The progress permission information is, for example, information such as "a section from the point A to the point B is open". When the train 3 receives the progress permission information, the train 3 can travel thereafter.

Next, the on-ground safety device 25A can continuously know the position of the train 3 by acquiring the on-rail position of the train 3 from the on-board safety device 35A.

The on-ground safety device 25A determines whether or not the progress is permitted, based on this transmitted information and the route request, and transmits the determination result to the on-board safety device 35A.

[On-Board Control Unit 30A]

Next, the on-board control unit 30A will be described.

The on-board control unit 30A is installed in each of the plurality of trains 3 and communicates with the on-ground safety device 25A to transmit information.

The on-board control unit 30A includes an on-board traffic control device 31A, an automatic train operation unit 33A, and an on-board safety device 35A. The on-board traffic control device 31A, the automatic train operation unit 33A, and the on-board safety device 35A are individually illustrated in FIG. 3 to distinguish their respective functions, but software that performs each function may be incorporated in the integrated hardware, or each can be a separate body as hardware. However, in view of the performance of the current computer device, even when the former form is adopted, each function can be sufficiently exhibited and the cost can be suppressed.

The on-board traffic control device 31A, the automatic train operation unit 33A, and the on-board safety device 35A have redundancy.

[On-Board Traffic Control Device 31A]

The on-board traffic control device 31 stores in advance information about a path on which the train 3 should travel in each driving mode, information about a stop time at the platform 9, information about the sequence of routes required to travel along a path, and the like. These pieces of information are collectively called traffic control information.

When the driving mode is transmitted from the on-ground safety device 25A, the on-board traffic control device 31A refers to the traffic control information and generates information on a route request for the train 3 to travel. Here, the route request is to request the on-ground safety device 25A to secure a route along which the train 3 will travel and to lock such that another train 3 cannot enter. The on-board traffic control device 31A transmits the generated information on the route request to the on-ground safety device 25A.

In addition, when receiving the transmitted driving mode, the on-board traffic control device 31A refers to the traffic control information, and then issues a departure command to the automatic train operation unit 33A. In addition, the on-board traffic control device 31A transmits to the automatic train operation unit 33A, information about the platform 9 to stop next, and other information necessary for operation.

[On-Board Safety Device 35A]

The on-board safety device 35A has a function of controlling a brake included in the train 3. The on-board safety device 35A has a function of detecting the current position of the train 3 and a function of detecting the current traveling speed of the train 3. The information on the train position and the traveling speed is acquired for the train 3 that is actually traveling.

The on-board safety device 35A transmits the progress permission information from the on-ground safety device 25A to the automatic train operation unit 33A, constantly monitors the position and speed of the train 3, and outputs emergency brake when it is determined that the progress-permitted range may be exceeded.

Further, the on-board safety device 35A transmits the position where the train 3 of its own is traveling to the on-ground safety device 25A.

[Automatic Train Operation Unit 33A]

The automatic train operation unit 33A receives the transmitted information about the time to stop at the platform 9 from the on-board traffic control device 31A and the progress permission information from the on-ground safety device 25A. The automatic train operation unit 33A controls the automatic train operation of the train 3 by controlling the operation of the power source included in the train 3, based on these pieces of information.

[Effect]

Next, effects of the traffic control system 10A according to the first embodiment will be described.

[Detailed Operation Control]

First, in the traffic control system 10A, the on-board traffic control device 31A provided in the train 3 that is actually traveling can accurately detect its own traveling position and traveling speed. Therefore, since a route request may not be made more quickly than necessary, detailed operation control of the train 3 can be realized. Hereinafter, this effect will be described with reference to FIG. 4.

Figure 4A:
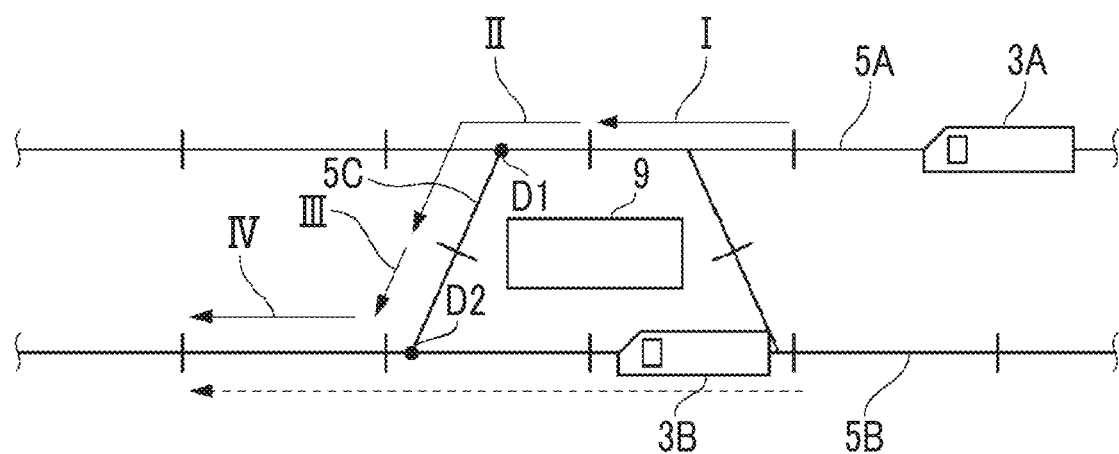
FIGS. 4A-4B are diagrams showing a traveling example of a train in the traffic control system according to the first embodiment.

Now, as shown in FIG. 4A, it is assumed that the train 3A is traveling on the track 5A while the train 3B is traveling on the track 5B. The train 3A and the train 3B are traveling in the same direction in FIG. 4A. For example, it is assumed that the train 3A travels on the path indicated by the solid-line arrows and the train 3B travels on the path indicated by the broken-line arrows, from the time point of FIG. 4A. That is, the train 3A proceeds from the track 5A through the branches D1 and D2 at both ends of the track 5C to the track 5B, and the train 3B proceeds along the track 5B.

Before the trains 3A and 3B travel on the above paths, the respective route requests are made as described above. When routes I, II, III, and IV are locked for the train 3A, the train 3B cannot proceed to the route IV.

Here, when it is necessary to expedite the route request for the train 3A, as shown in FIG. 4A, the route request when the train 3A is located farther from the route IV, that is, the routes I, II, III and IV are locked. Then, as shown in FIG. 4A, the train 3B can no longer proceed to the route IV, and the operation of the train 3B is stopped.

Figure 4B:
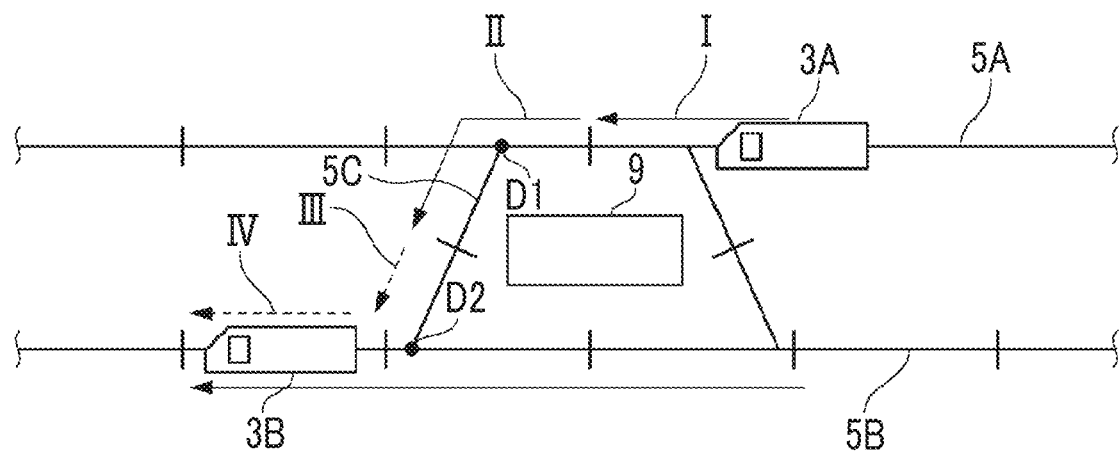

On the other hand, when the route request for the train 3A may be delayed, as shown in FIG. 4B, the route request, that is, the route IV is locked after the train 3A approaches the route IV. Then, as shown in the drawing, the train 3B can proceed to the route IV in advance, and the train 3A can proceed to the route IV in succession to the train 3B thereafter. That is, when the route request may be delayed, the operations of both the trains 3A and 3B are less likely to be adversely affected.

For example, when the traffic control device is installed on the ground, this traffic control device cannot detect the exact traveling position and traveling speed of the train 3. Therefore, when the traffic control device is installed on the ground, it is necessary to make a route request as soon as possible, and there is a high possibility that the operation will be stopped as shown in FIG. 4A.

On the other hand, according to the traffic control system 10A, the on-board traffic control device 31A can accurately detect the current position and traveling speed of the vehicle. Therefore, according to the traffic control system 10A, the route request can be delayed, so that the operations of the trains 3A and 3B are unlikely to be affected as shown in FIG. 4B.

When the route request can be delayed, it is also effective, for example, even in a case where the traveling is stopped while the train 3 is traveling and the route is changed. Hereinafter, this effect will be described with reference to FIG. 5.

Figure 5A:
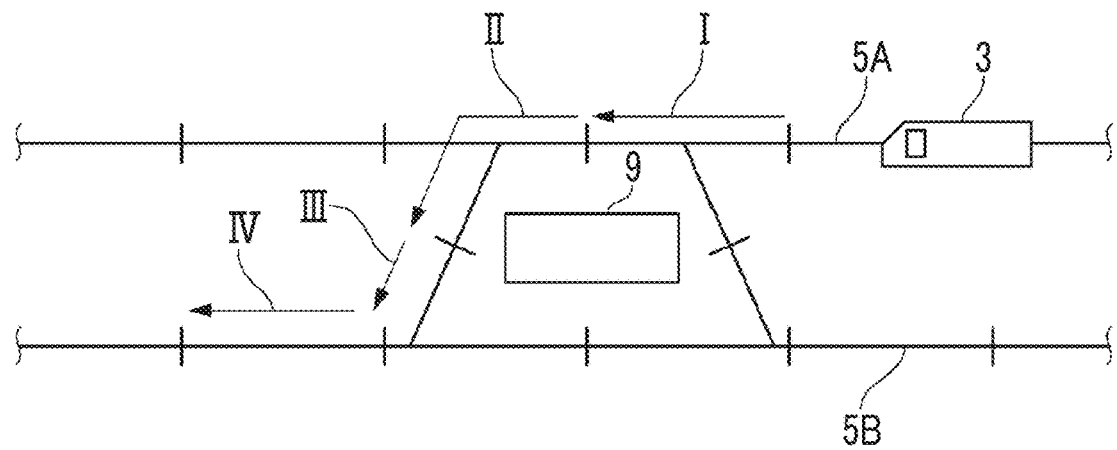
FIGS. 5A-5C are diagrams showing another traveling example of a train in the traffic control system according to the first embodiment.

As shown in FIG. 5A, the train 3A traveling on the track 5A is initially requested to have the routes I, II, III, and IV in this order, but it is assumed that the path consisting of routes I, II, III and IV needs to be changed.

Figure 5B:
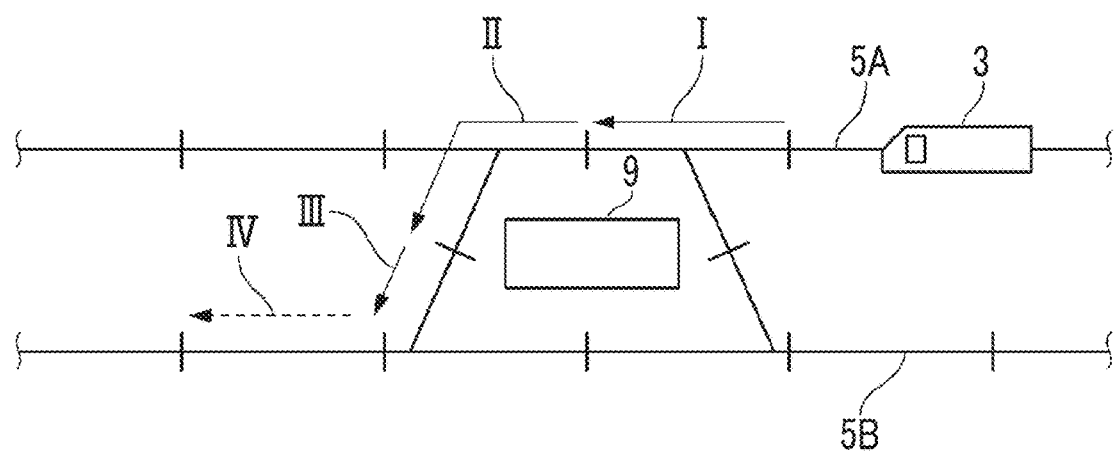
Figure 5C:
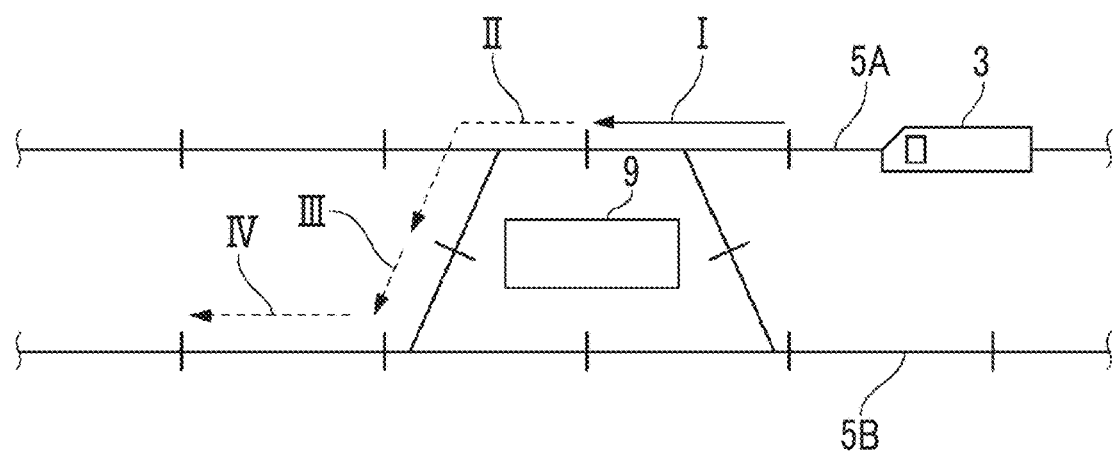

The route request needs to be unlocked prior to changing the path. Taking FIG. 5A as an example, it is necessary to unlock the routes I, II, III, and IV. In FIGS. 5A to 5C, the locked routes I, II, III and IV are shown by solid lines, and the unlocked routes I, II, III and IV are shown by broken lines.

In releasing the lock, the stop position predicted from the traveling position and the traveling speed of the traveling train 3 is used as a reference. That is, the lock of the route ahead of the predicted stop position is released, and even if a route is the predicted stop position but the train passes through the route, the lock of the route is released.

Here, when the exact traveling position and traveling speed of the train 3 cannot be known, the exact stop position of the train 3 cannot be predicted. Therefore, even if the train 3 can actually be stopped before the route close to the train 3, it cannot be predicted that the train 3 can be stopped there, so that only the route farther from the train 3, at which the train 3 can be reliably stopped, is unlocked.

In the example shown in FIG. 5, if the exact traveling position and traveling speed of the train 3 cannot be known, only the route IV farthest from the train 3 is unlocked, as shown in FIG. 5B. On the other hand, if the exact traveling position and traveling speed of the train 3 is known, it can be predicted that the train 3 can be stopped before the route II, the routes II, III, and IV can be unlocked, as shown in FIG. 5C.

The unlocked routes are opened to the route request of another train 3. Whereas only the route IV is opened in the case of FIG. 5B, the routes II and III are also opened in addition to the route IV in the case of FIG. 5C.

As described above, since the train 3 includes the on-board traffic control device 31A, the exact traveling position and traveling speed of the train 3 can be known, so that the range in which the set route is maintained can be minimized. Thus, the selection range of the route requests of the other trains 3 is increased, and fine driving control of the traffic system 1 can be realized.

[Continuity of Operation]

In addition, in the traffic control system 10, even when the console 21A fails, each train 3 can continue operation while autonomously requesting a route under the control of the on-board traffic control device 31A according to the instructed driving mode. Thus, for example, during manual driving, free traveling can be performed while ensuring safety without an operator's operation. Even in the automatic train operation, the autonomous traveling securing safety can be performed without continuous operation.

[Cost Reduction]

Further, in the traffic control system 10A, the train 3 needs to be provided with the on-board traffic control device 31A. However, in recent years, the capacity of the calculator has been improved, so that the on-board traffic control device 31A can be realized by adding the function of the on-board traffic control device 31A as software to the hardware that is originally installed on the vehicle to configure the automatic train operation unit 33A and the on-board safety device 35A. Therefore, there is no cost of adding new hardware for the on-board traffic control device 31A.

Further, as described above, since the traffic control system 10A is capable of autonomous traveling, it is not necessary to make the console 21A redundant, and the amount of information processing can be small if only the function of the console 21A is provided. Therefore, the hardware required for the console 21A is low in cost.

Second Embodiment

Next, an traffic control system 10B according to a second embodiment of the present invention will be described with reference to FIGS. 6 and 7.

Figure 6:
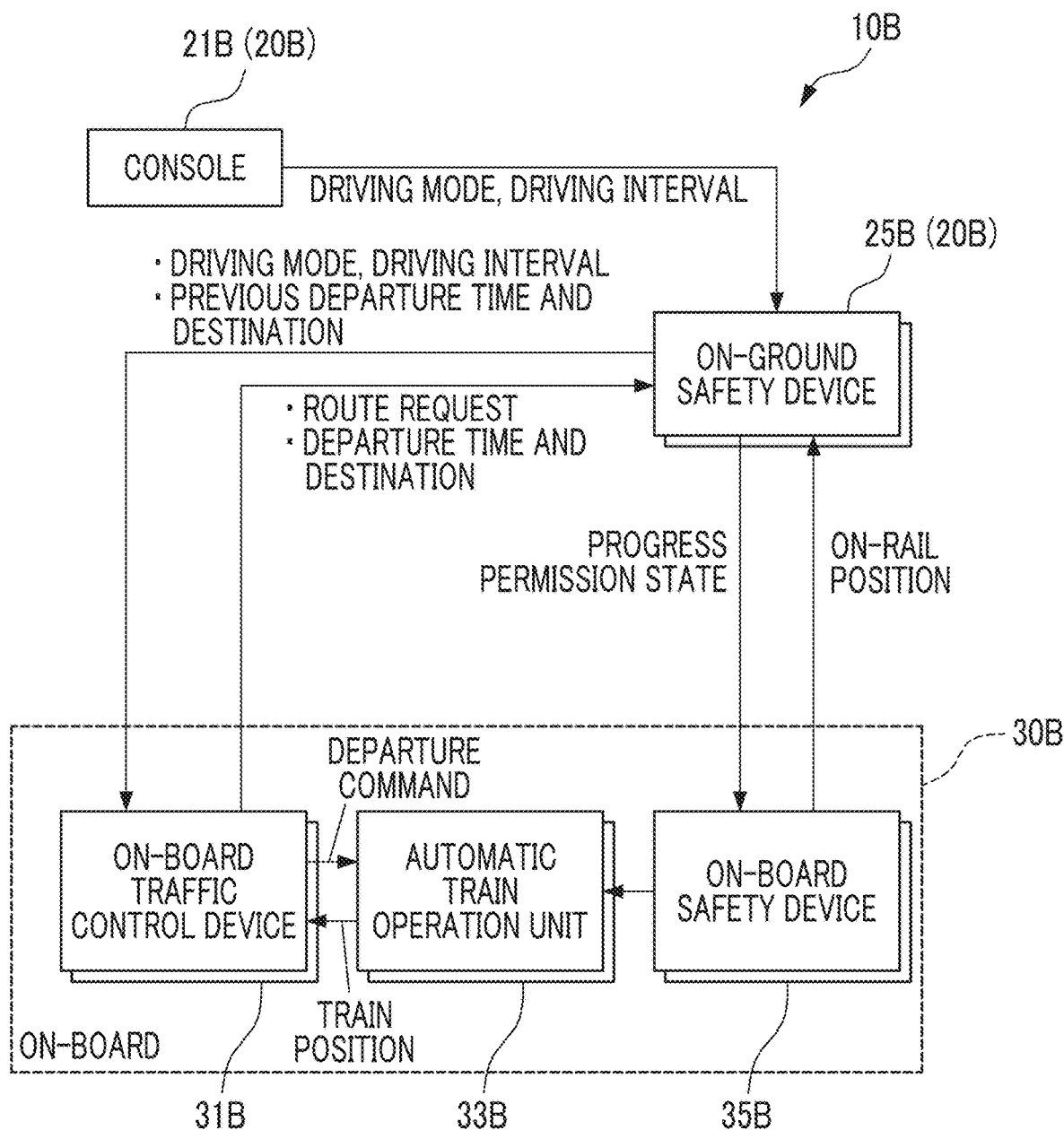
FIG. 6 is a functional block diagram showing an traffic control system according to a second embodiment of the present invention.

The traffic control system 10B is common to the on-ground control unit 20A and the on-board control unit 30A of the traffic control system 10A, as shown in FIG. 6, in that the on-ground control unit 20B includes a console 21B and an on-ground safety device 25B, and the on-board control unit 30B includes an on-board traffic control device 31B, an automatic train operation unit 33B, and the on-board safety device 35B. Below, the traffic control system 10B will be described focusing on the differences from the traffic control system 10A.

[On-Ground Control Unit 20B]

In the console 21B that constitutes the on-ground control unit 20B, the driving time intervals of the plurality of trains 3 traveling on the track 5 are set based on the currently set driving mode and the number of trains that are operating. The set driving interval is transmitted to the on-ground safety device 25B. Here, the driving interval means a driving interval between the preceding train 3 and the succeeding train 3.

The on-ground safety device 25B transmits the driving interval transmitted from the console 21B in addition to the driving mode, to the on-board traffic control device 31B of the on-board control unit 30B.

The on-ground safety device 25B stores the departure time and the destination of the train 3 notified from the on-board traffic control device 31B in association with the platform 9 from which the train 3 has departed. For example, the on-ground safety device 25B stores the time when the preceding train 3 departs from the platform 9 and the destination of the train 3 in association with the platform 9 from which the train 3 has departed and the train 3.

When departing the platform 9, the on-board traffic control device 31B transmits the departure time and the destination to the on-ground safety device 25B. The on-ground safety device 25B stores the transmitted departure time and destination.

When arriving at the platform 9, the on-board traffic control device 31B inquires of the on-ground safety device 25B about the driving mode, the departure time, the destination, and the travel time interval of the preceding train 3. The on-board traffic control device 31B determines the departure time of its own train 3 based on this.

[Effect]

Next, effects of the traffic control system 10B according to the second embodiment will be described. Here, effects unique to the second embodiment (the traffic control system 10B) will be described.

In the traffic control system 10B, the succeeding train 3 can acquire the departure time and the destination of the preceding train 3. Therefore, even if the preceding train 3 is delayed, the on-board traffic control device 31B of the succeeding train 3 having the same destination as the preceding train can adjust the departure time of its own train 3 at the station considering that the departure time of the preceding train 3 at the station has been delayed. Therefore, according to the traffic control system 10B, even when a delay occurs in any of the trains 3, the entire driving interval can be kept constant.

Next, according to the traffic control system 10B, an advantageous effect is produced when a route request is generated in which the preceding train and the succeeding train use the same platform of the platform 9 before and after. Hereinafter, this effect will be described with reference to FIG. 7.

Figure 7A:
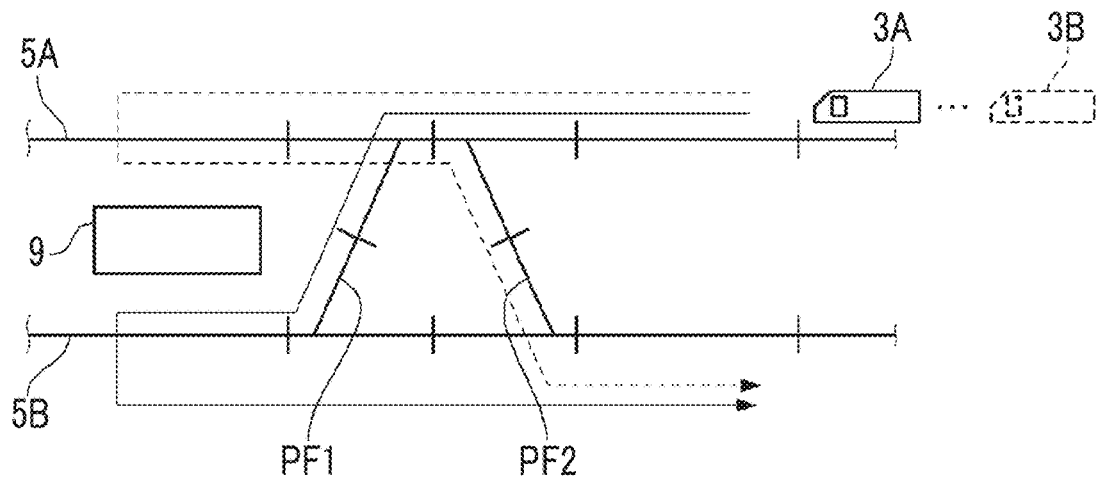
FIGS. 7A-7C are diagrams showing a traveling example of a train in the traffic control system according to the second embodiment.

Now, as shown in FIG. 7A, it is assumed that a train 3A and a train 3B traveling on the same track 5A one after another with a predetermined interval travel to the track 5B via the platform PF1 or platform PF2 of the platform 9, and the driving mode is set such that the trains travel in the opposite direction to the case of the track 5A. The platform PF1 is one of the destinations of the preceding train 3A, and the platform PF2 is one of the destinations of the train 3B.

Figure 7B:
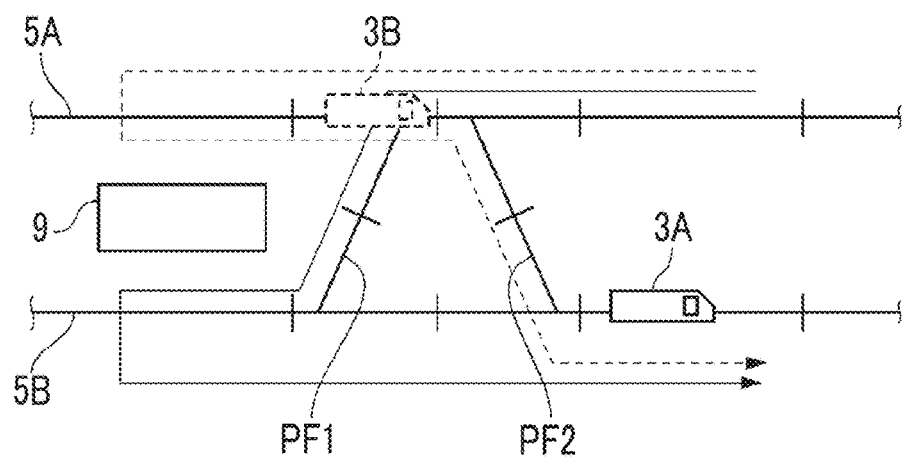
Figure 7C:
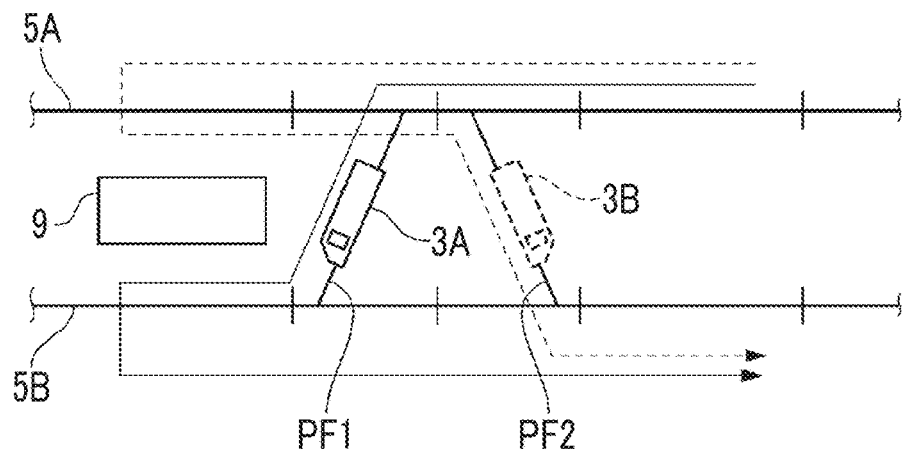

At this time, the on-board traffic control device 31B of the train 3B makes a route request so as to pass through a platform PF2 different from the platform PF1 through which the train 3A that has departed in advance from the platform 9 has passed. FIG. 7B shows that the preceding train 3A passes through the platform PF1 and then the succeeding train 3B attempts to enter the platform PF2.

By alternately using the platforms in this way, even when the number of passengers on the platform is large, that is, the train 3 is stopped for a long time, the traveling intervals of the trains can be shortened, and a high traffic amount can be secured.

Third Embodiment

Next, a third embodiment of the present invention will be described with reference to FIGS. 8 to 10.

While operating the traffic system 1, it may be desired to travel the train 3 on a path different from the path according to the predetermined driving mode. The traffic control system 10C according to the third embodiment has a mechanism for responding to this request.

In the traffic control system 10C, as shown in FIG. 8, the operator manually transmits information about the platform 9 which is the changed destination, as a command, via the console 21C, to the on-board traffic control device 31C. Although the destination (platform 9) is an example that can be instructed via the console 21C, the items that can be instructed are optional, destinations other than the platform 9 can be instructed, and as will be described later, an instruction only to cancel the destination can be given.

The on-board traffic control device 31C searches for a route from the current position to the designated destination, and makes a new route request according to the search result. For the path search, for example, the Dijkstra's algorithm can be applied to the path that minimizes the cost such as distance and time. The procedure for changing the destination will be described with reference to FIG. 9.

[Destination Change]

Figure 9A:
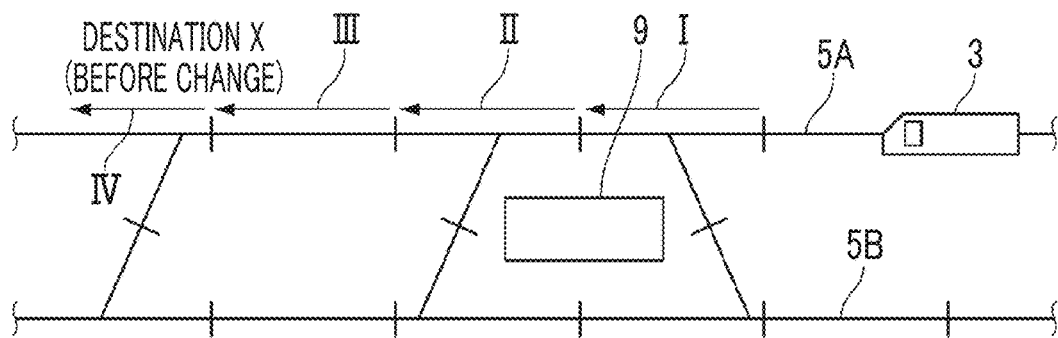
FIGS. 9A-9D are diagrams showing a procedure for changing a destination in the traffic control system according to the third embodiment.
Figure 9B:
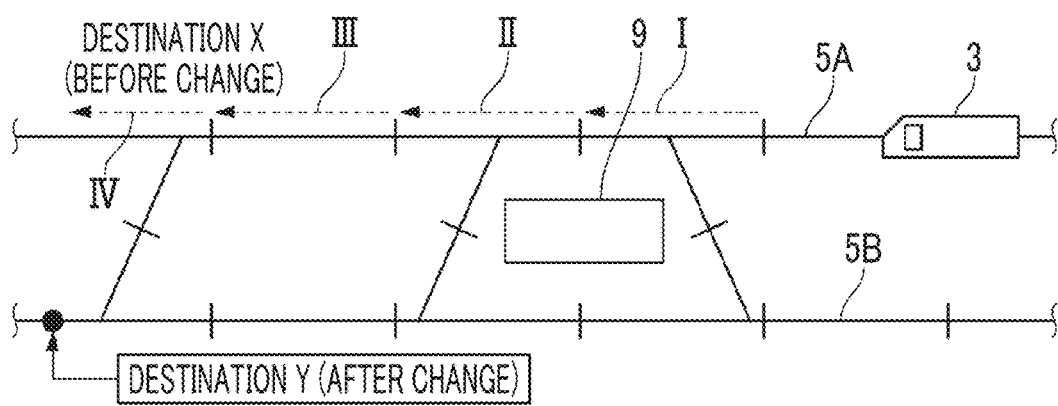

As shown in FIG. 9A, it is assumed that the train 3 is traveling on the track 5A and the destination X before the change is located farther than the left end of the track 5A in FIG. 9A. Then, it is assumed that the operator instructs the on-board traffic control device 31C via the console 21C to change the destination X to the destination Y as shown in FIG. 9B.

Figure 9C:
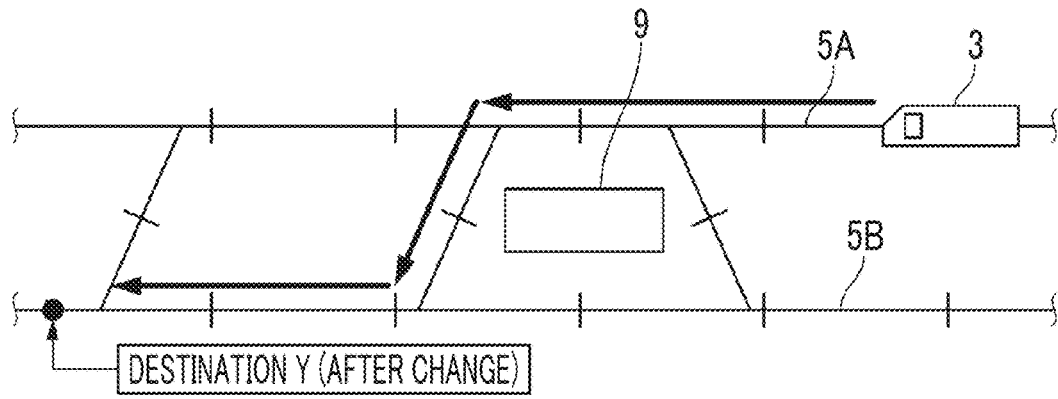
Figure 9D:
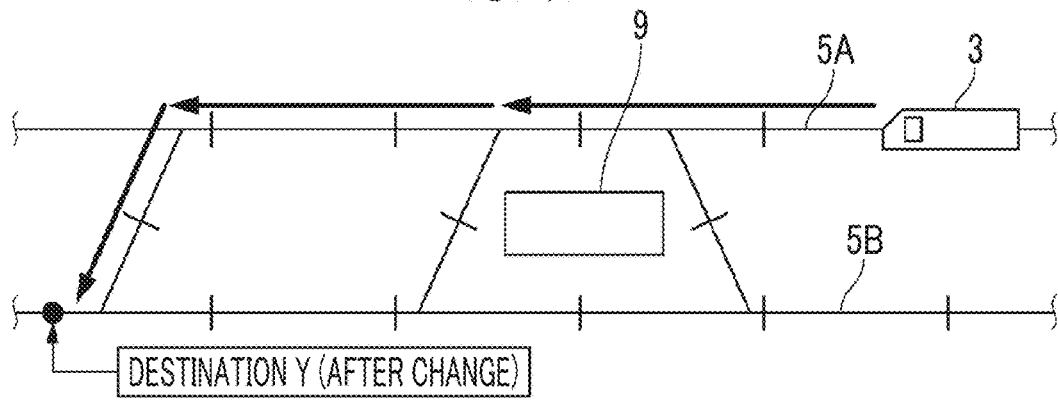

The on-board traffic control device 31C that has received the instruction searches for a new path to the destination Y while maintaining the route request for the routes I, II, III, and IV leading to the previous destination X. It is indicated by a broken line in FIG. 9B that the route request is maintained. FIG. 9C shows Candidate 1 of the route searched while maintaining the route request, and FIG. 9D shows Candidate 2 of the route. These candidates are the result of extracting the paths to reach the destination Y, and by comparing the two candidates, the candidate 1 or the candidate 2 having a low cost is selected as a new path.

When a new path to the destination Y is selected, the on-board traffic control device 31C cancels the route request to the previous destination X and then issues a route request to the new destination Y. In FIGS. 9C and 9D, the routes I, II, III, and IV to the destination Y for which the route is newly requested are shown by thick solid lines. It should be noted that the overlapping routes in the previous path and the new path may be retained without canceling the setting.

Next, an example in which only an instruction to cancel the already set destination is given will be described with reference to FIG. 10.

Figure 10A:
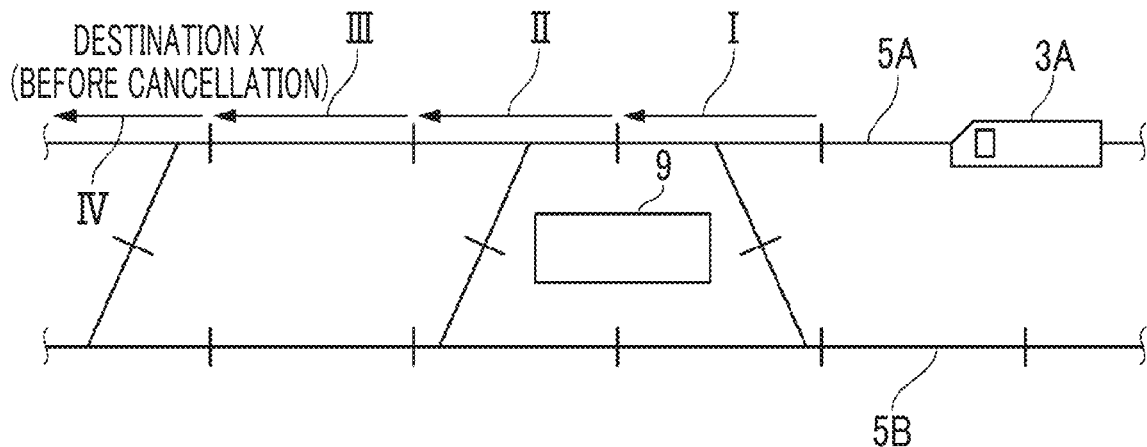
FIGS. 10A-10C are diagrams showing a procedure for canceling a destination in the traffic control system according to the third embodiment.
Figure 10B:
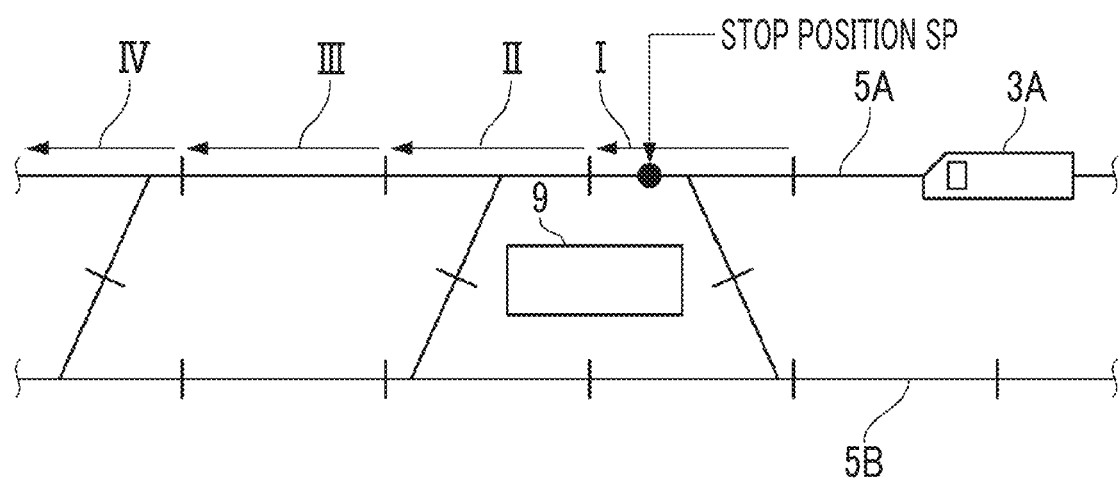

It is assumed that the operator transmits an instruction to cancel the destination X already set to the on-board traffic control device 31C via the console 21C. As shown in FIG. 10A, it is assumed that the train 3 is traveling on the track 5A and the destination X before cancellation is located farther than the left end of the track 5A in FIG. 10A.

The on-board traffic control device 31C, which has received the transmitted cancellation of the destination X, calculates and predicts the position on the track 5 at which the vehicle can be stopped from the current position and the traveling speed of itself (train 3). The calculated result is shown as the planned stop position SP in FIG. 10B.

[Destination Cancellation]

Figure 10C:
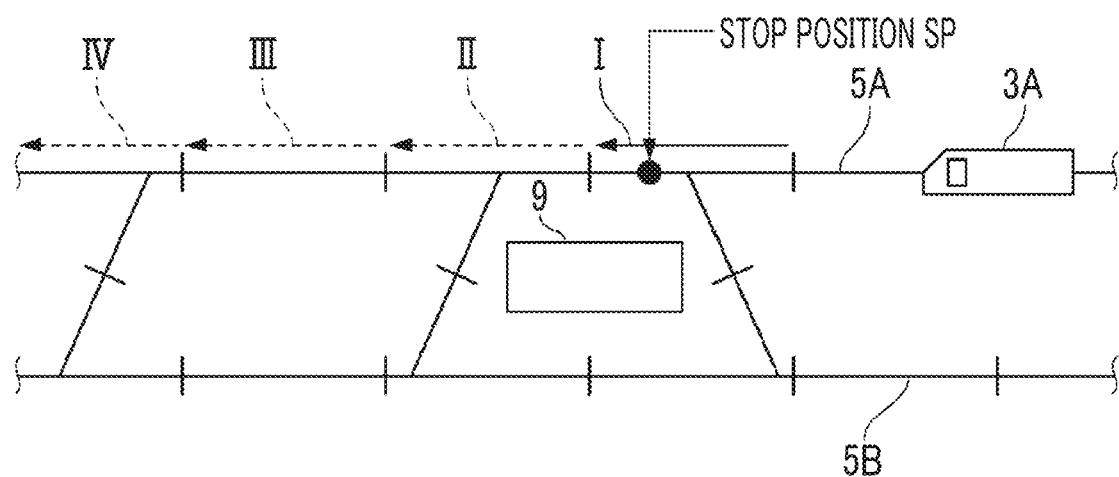

Next, the on-board traffic control device 31C cancels the setting of the remaining routes II, III, and IV while maintaining the setting of the route I to the planned stop position SP. FIG. 10C shows this state, in which the retained route I is shown by a solid line, and the unlocked routes II, III, and IV are shown by broken lines.

For example, when the traveling position and traveling speed of the train 3 cannot be clearly known, it is necessary to predict the planned stop position SP farther, and therefore it is necessary to maintain the setting from the train 3 to a farther route. For example, in FIG. 10, if the route requests are retained for the routes I to III, the settings for the routes II to III are unnecessarily retained.

As described above, according to the third embodiment, it is possible to minimize the route that is unnecessarily retained, when canceling the destination. Thus, according to the third embodiment, it is possible to reduce the possibility of hindering the travel of other trains 3, and thus it is possible to flexibly operate the traffic system 1.

Fourth Embodiment

When the train 3 autonomously makes a route request as in the first to third embodiments, a deadlock may occur and it may be difficult to continue the operation thereafter. The fourth embodiment proposes a procedure for preventing the occurrence of this deadlock. This procedure is executed by the on-board traffic control device 31.

Hereinafter, the deadlock will be described first with reference to FIG. 11, and then the procedure for preventing the occurrence of the deadlock will be described with reference to FIG. 12.

Figure 11A:
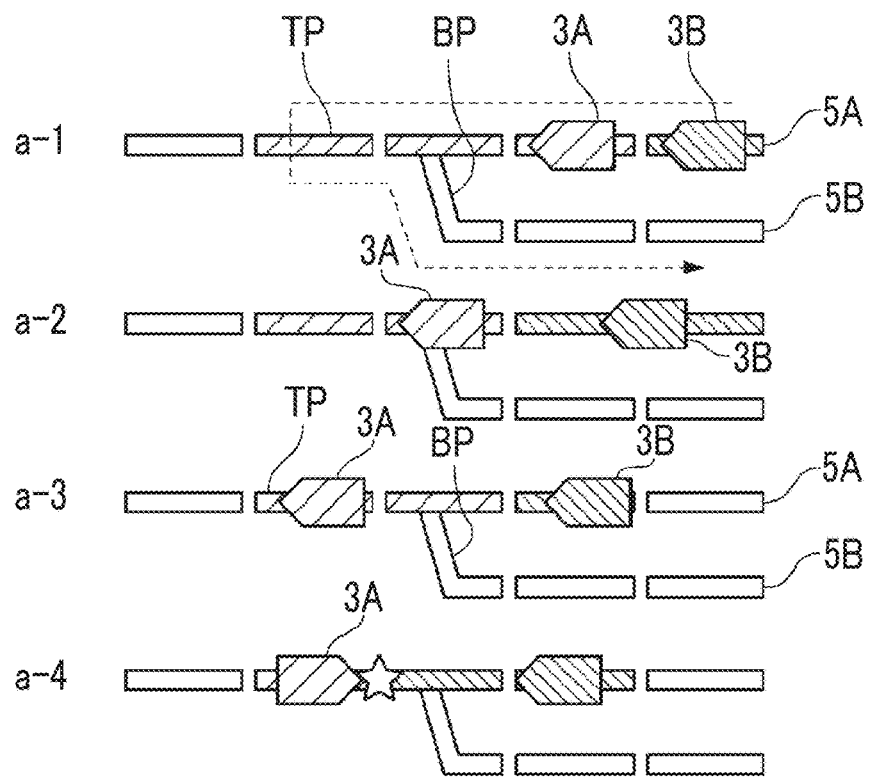
FIGS. 11A-11B are diagrams explaining a deadlock.
Figure 11B:
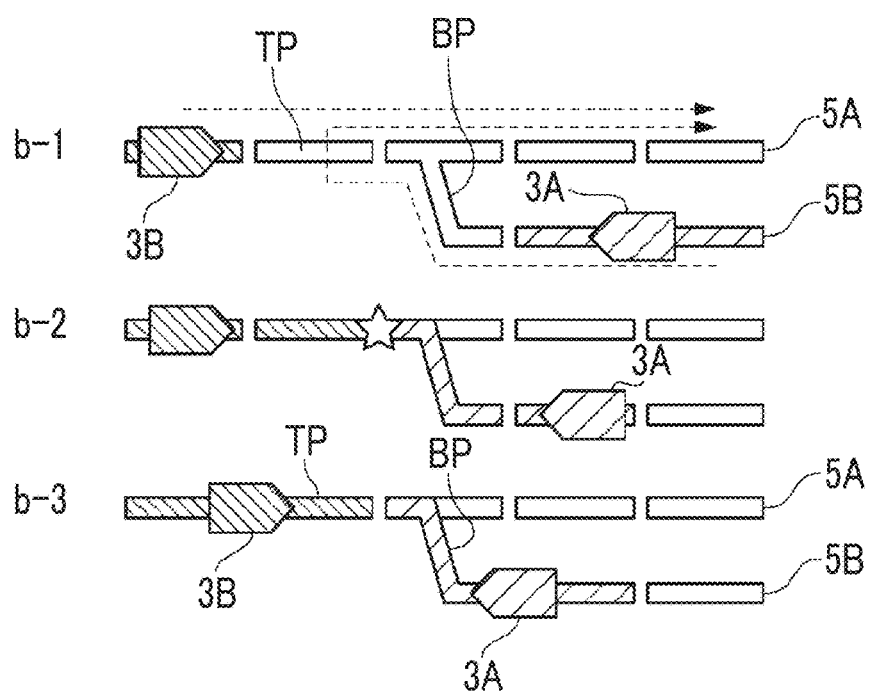

The deadlock may occur when differently organized trains 3 travel one after another at the turning part shown in FIG. 11A, or when differently organized trains 3 merge at the turning part shown in FIG. 11B.

First, as shown in a-1 of FIG. 11A, it is assumed that the two trains 3A and 3B are traveling in the track 5A before and after, but the preceding train 3A passes through the branch route BP and then turns back on the turning route TP to travel in the opposite direction, and enters the track 5B from the branch route BP.

In FIG. 11, it is shown that tracks 5A and 5B with the same hatching as the hatching of the trains 3A and 3B are requested by the trains 3A and 3B. Further, it is indicated that the outline tracks 5A and 5B are not requested to travel by any of the trains 3A and 3B. The same applies to FIG. 12.

When the train 3A and the train 3B continue to travel as indicated by a-1 and a-2 in FIG. 11A, the train 3A changes the direction and turns back as indicated by a-3 and a-4 in FIG. 11A. However, even when the train 3A attempts to move to the right in the figure, the train 3A cannot proceed to the track 5B through the branch route BP because the branch route BP is requested by the succeeding train 3B. On the other hand, the train 3B cannot proceed to the turning route TP requested by the train 3A. In this way, a deadlock occurs in which both the train 3A and the train 3B cannot continue to travel any further.

Next, as indicated by b-1 in FIG. 11B, it is assumed that the train 3A travels on the track 5A in the right direction in the figure, while the train 3B travels on the track 5B in the left direction in the figure, passes through the branch route BP, turns back on the turning route TP, and travels on the track 5A in the right direction in the figure.

However, when the train 3A and the train 3B respectively make a route request, as shown in b-2 and b-3 of FIG. 11B, there are routes which have already been set respectively by the other parties ahead of the traveling directions of the train 3A and the train 3B. Then, a deadlock occurs in which both the train 3A and the train 3B cannot continue to travel any more.

Therefore, the on-board traffic control device 31 avoids the deadlock by performing route setting according to the rule including the following first condition and second condition.

First Condition

Figure 12A:
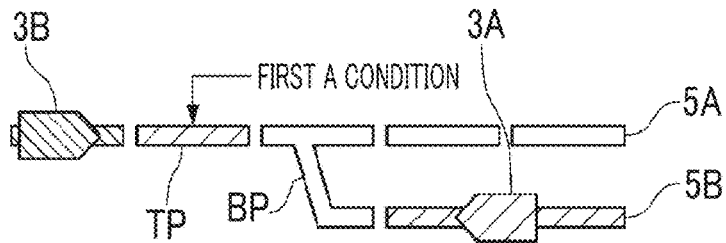
FIGS. 12A-12E are diagrams showing a procedure for avoiding a deadlock in the traffic control system according to the fourth embodiment of the present invention.

Condition 1A: For example, as shown in FIG. 12A, when performing a turning-back driving, a route request made for a turning route TP ahead of the branch route BP such that the turning route TP can be occupied by itself. At this point in time, the route request for the closer branch route BP than the turning route TP has not been made, so the route request for the turning route TP is made prior to the route request for the branch route BP.

Figure 12B:
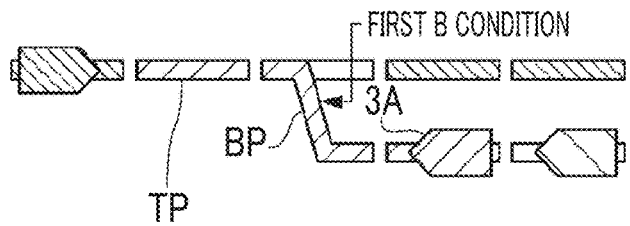

Condition 1B: Only when the route request of Condition 1A is made, for example, as shown in FIG. 12B, a route request is also made for the branch route BP leading to the turning route TP. This secures a path in which the train 3A turns back on the turning route TP and travels rightward on the track 5A.

Figure 12C:
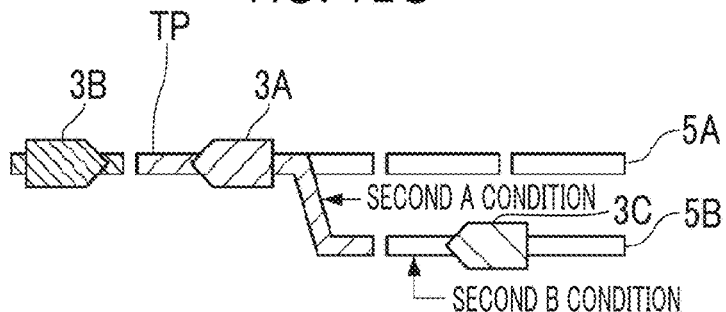
Figure 12D:
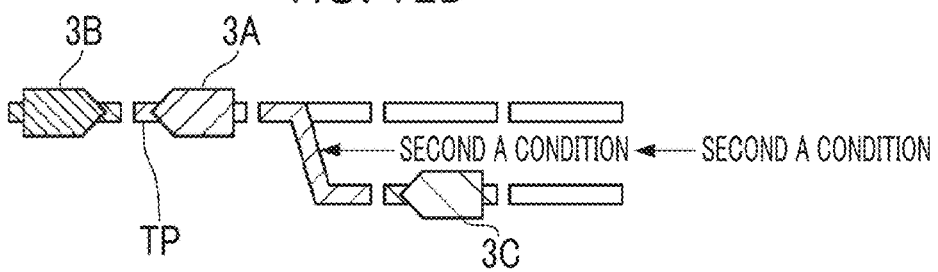
Figure 12E:
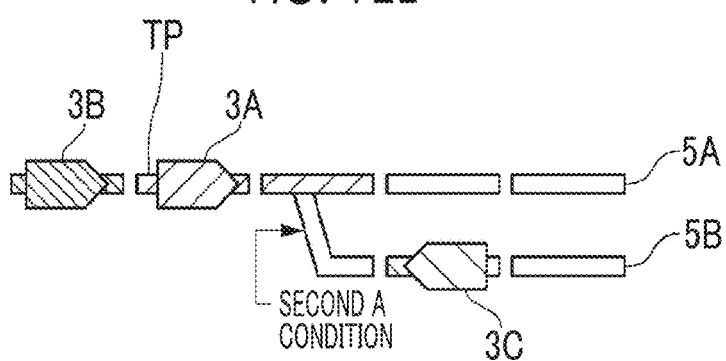

Second Condition:

Condition 2A: For example, as shown in FIGS. 12C, 12D, and 12E, for the branch route BP leading to the turning route TP, a locked state is retained such that the train 3A can continuously use the branch route BP. After the train 3A passes through again, the locked state is released.

Condition 2B: When the route leading to the turning route TP is not the branch route BP, the lock of the route passed by the train 3A is immediately released.

By observing the above rules, the train 3C does not prevent the train 3A from traveling to the planned track 5A (FIG. 12E).

Further, when the route leading to the turning route TP is not the branch route BP, the lock of the route passed by the train 3A is immediately released, so that the hindrance to the traveling of the succeeding train 3C is minimized.

Although the preferred embodiments of the present invention have been described above, the configurations described in the above embodiments can be selected or changed to other configurations without departing from the spirit of the present invention.

For example, in the above description, the on-board traffic control device 31 is supposed to communicate directly with the ground device, but it is not always necessary to have its own communication route, and a communication route may be included in the communication message between the on-ground safety device and the on-board safety device.

Further, the on-board control unit 30 includes an on-board traffic control device 31, an automatic train operation unit 33, and an on-board safety device 35, which are classified only by a function and are not distinguished from each other as hardware whether they are integrated or separate bodies.

The invention claimed is:
1. A traffic control system comprising:
on-board control units installed on trains whose operations are managed by the traffic control system and that are traveling; and
an on-ground control unit installed on the ground,
wherein a respective one of the on-board control units:
is installed in each of the trains,
sets a driving path for the train provided with the on-board control unit based on a destination,
makes a route request for a route to turn back when the driving path is set in which the train provided with the on-board control unit performs a turning-back driving,
makes a route request for a branch route leading to the route to turn back when the route request for the route to turn back is made,
transmits information on the route requests to the on-ground control unit, and
controls driving of the train provided with the on-board control unit on the set driving path based on a traveling position and a traveling speed detected in the train provided with the on-board control unit, and
wherein the on-ground control unit:
controls a route of the train provided with the on-board control unit based on the transmitted information on the route requests.
2. The traffic control system according to claim 1, wherein, when the train provided with the on-board control unit passes the branch route, the on-board control unit maintains the route request for the branch route for a predetermined period, and then, cancels the route request for the branch route.

* * * * *